United States Patent [19]

Ismatkhodzhaev et al.

[11] 4,160,196
[45] Jul. 3, 1979

[54] TWO-PHASE AC ELECTRIC MOTOR CONTROL CIRCUIT

[76] Inventors: Sagdulla K. Ismatkhodzhaev, Massiv Severo-Vostok-2, 51, kv. 56; Salikh Z. Usmanov, proezd Morozova, 3, kv. 7, both of Tashkent; Mirmakhmud A. Mirsagatov, poselok Salar, ulitsa Khamza, 13, Tashkentskaya oblast Ordzhonikidzevsky raion; Nasim G. Dzhabarov, Ts-13, dom 11, kv. 35, Tashkent-128; Makhirdzhan Takhirdzhanov, ulitsa Kurskaya, 15, Tashkent; Anvardzhan F. Mumindzhanov, ulitsa Raskovoi, 44, Tashkent, all of U.S.S.R.

[21] Appl. No.: 809,046

[22] Filed: Jun. 22, 1977

Related U.S. Application Data

[63] Continuation of Ser. No. 576,096, May 8, 1975, abandoned.

[51] Int. Cl.² ............................................. H02P 1/40
[52] U.S. Cl. .................................................. 318/749
[58] Field of Search ........... 318/207 R, 207 A, 207 B, 318/209, 210, 289

[56] References Cited

U.S. PATENT DOCUMENTS

| 2,407,994 | 9/1946 | Menzies | 318/207 A |
| 2,509,898 | 5/1950 | Wiseman | 318/207 A |
| 2,707,259 | 4/1955 | Rech | 318/207 A |
| 3,087,102 | 4/1963 | Brown | 318/207 R |
| 3,593,080 | 7/1971 | Reynolds | 318/207 R |

*Primary Examiner*—Herman Hohauser
*Attorney, Agent, or Firm*—Haseltine, Lake & Waters

[57] ABSTRACT

A control circuit of a two-phase AC electric motor wherein the windings and two series capacitors are delta-connected, the winding mid point is brought to one terminal of the power source, and the winding leads connected to the capacitors are brought to the other terminal of the power source through switchgear components.

The control circuit is distinguished from the prior-art control circuits in that the mid point of the capacitors is connected to the mid point of the switchgear elements, with the capacitance of each capacitor being equal to the rated phase-shifting capacitance of the electric motor.

2 Claims, 1 Drawing Figure

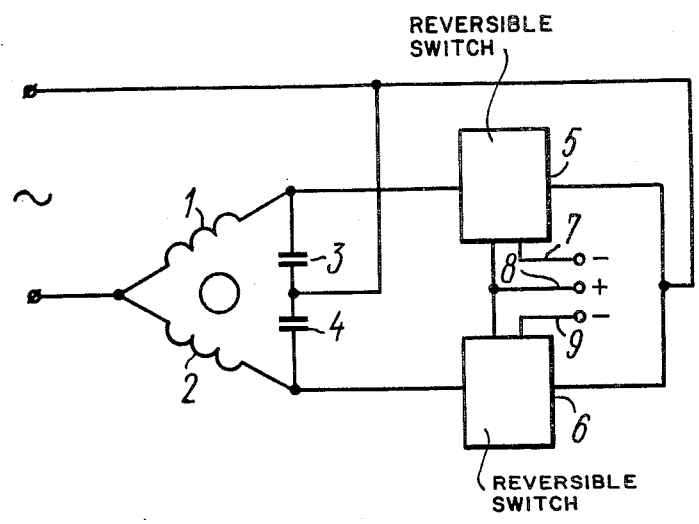

TWO-PHASE AC ELECTRIC MOTOR CONTROL CIRCUIT

This is a continuation of application Ser. No. 576,096 filed May 8, 1975, now abandoned.

The present invention relates to two-phase AC electric motor controls, and can be used in particular to control two-phase electric motors of actuating devices included into automatic regulation system incorporating three-position controllers.

Known in the art are a method and a circuit for control of a two-phase asynchronous motor wherein the motor winding and phase-shifting subdivided capacitors are delty-connected, the mid point of the windings is brought to one terminal of the power source, and two winding leads are brought to the capacitor side sections, with the motor rotor speed regulation and reversing effected by changing over the other terminal of the power source connected to the capacitor terminals through the use of switchgear components (cf. Japanese Pat. No. 31003 96/69, 55c 221).

However, to use the foregoing circuit for reversing and accurate stopping of shafts of two-phase motor actuating devices in automatic regulation systems by means of three-position controllers widely in use the world over, it is necessary that a three-position switch unit be used as a switchgear component, which is detrimental to reliability of the control circuit.

It is an object of the present invention to improve reliability of the control circuit.

The principal object of the present invention is to provide a two-phase AC electric motor control circuit capable of reversing and accurate stopping of the actuator motor incorporating three-position controllers, with the number of switchgear components reduced to two, i.e., with two-position switch units employed.

This object is accomplished by providing a two-phase AC electric motor control circuit, wherein the motor windings and two series capacitors are delta-connected, the mid point of the windings is connected to one terminal of the power source, and two winding leads are connected to the other terminal thereof, characterized, according to the invention, in that the mid point of the capacitors is connected to the mid point of the switchgear components, with the capacitance of each capacitor being equal to the rated phase-shifting capacitance of the electric motor.

The invention will now be described in greater detail with reference to a preferred embodiment thereof taken in conjunction with the accompanying drawing which presents a schematic diagram of the control circuit, according to the invention.

The two-phase electric motor control circuit includes motor windings 1 and 2, and two series-connected phase-shifting capacitors 3 and 4.

The windings 1 and 2, and the capacitors 3 and 4 are delta-connected, the mid point of the windings 1 and 2 being brought to one terminal of the power source, and the winding leads connected to the capacitors being brought to the other terminal of the power source through switchgear components 5 and 6.

To fulfil the functions of the switchgear components, electromagnetic or semiconductor switches may be employed.

The mid point of the capacitors 3 and 4 is connected to the mid point of the switchgear components 5 and 6, with the capacitance of each capacitor being equal to the rated phase-shifting capacitance of the electric motor.

The switchgear components 5 and 6 are controlled by a signal derived from a three-position controller (not shown in the drawing), the output thereof is connected to terminals 7, 8 and 9 of the control circuit.

When a signal put out by the controller is applied to terminals 7 and 8 of the control circuit, the switchgear component 5 is closed, and the capacitor 3 is shunted. As a result, the electric motor control winding 1 is connected directly to the terminals of the power source, while the winding 2 is connected thereto via the phase-shifting capacitor 4. The motor starts in a certain direction.

When a signal supplied from the controller is applied to the terminals 8 and 9 of the control circuit, the switchgear component 6 is closed with the result that the power supply voltage is applied directly to the winding 2 because the phase-shifting capacitor 4 is shunted by the switchgear component 6 paralleled therewith, while the supply voltage applied to the winding 1 is carried through the phase-shifting capacitor 3. As a consequence, the electric motor starts in the opposite direction.

With no signal applied to the input terminals 7, 8 and 9, both switchgear components 5 and 6 are disconnected. However, the motor windings 1 and 2 remain connected to the power source terminals through the phase-shifting capacitors 3 and 4, and the motor rotor is braked. Thus, with the capacitance of each section in the subdivided capacitor equal to the rated phase-shifting capacity of the motor, direct connection of the subdivided capacitor mid point to the mid point of the switchgear components contributes to improved reliability in control of the two-phase AC electric motor, with the number of switchgear components cut down.

Consequently, the control circuit of the present invention permits reversing and accurate stopping of the two-phase electric motor in actuating devices incorporating only two switchgear components.

What is claimed is:

1. A control circuit of a two-phase AC electric motor with windings and two series capacitors delta-connected, a power source with two terminals, the midpoint of said windings being connected to one terminal of said power source, switching means with two shunt switching elements, each shunt switching element being connected between the other terminal of said source and a separate junction of said windings and said capacitors, the leads of said windings being connected to said capacitors and being brought to the other terminal of the power source, through said shunt switching elements, the midpoint of said capacitors being connected to said other terminal of said source, the capacitance of each said capacitor being equal to the rated phase-shifting capacitance of said electric motor.

2. A control circuit as defined in claim 1, wherein said switching means receives signals from a three-position regulator for shunting one or the other capacitor, said switching means being in open circuit condition in the absence of a signal from said regulator, said signal from said regulator to said switching means controlling rotation of said motor in either clockwise or counterclockwise direction and to stop rotation of the motor in the absence of a signal.

* * * * *